UNITED STATES PATENT OFFICE.

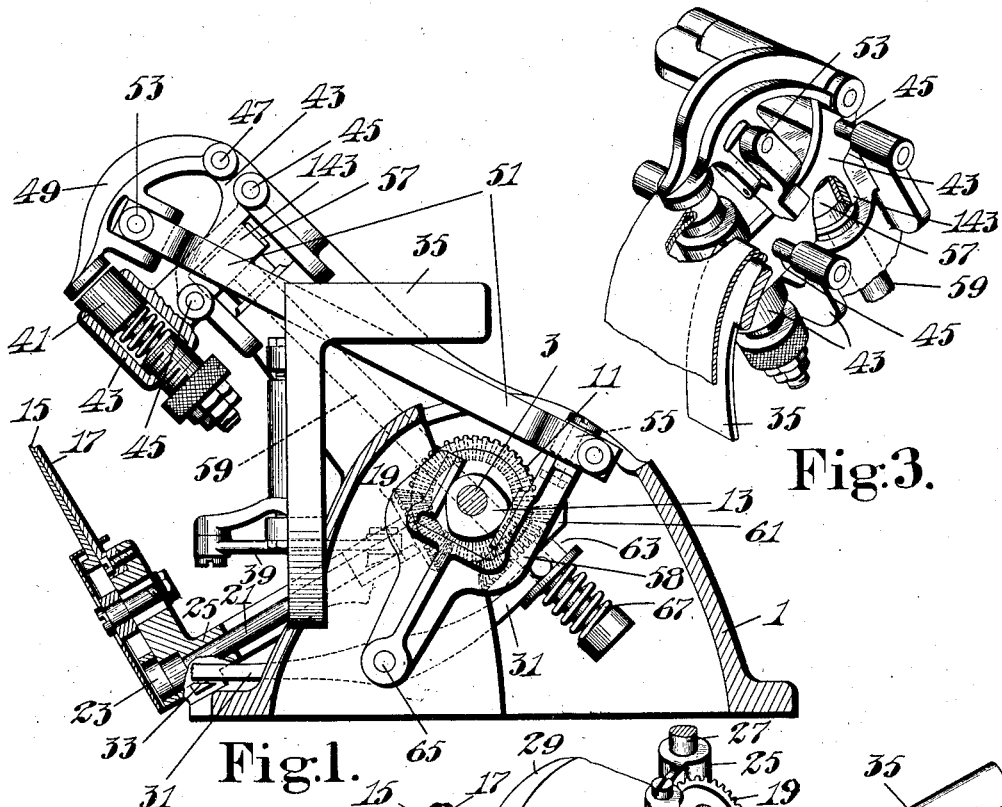

PERLEY R. GLASS, OF BROOKLINE, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

TURNING AND BEADING MACHINE.

1,389,643. Specification of Letters Patent. Patented Sept. 6, 1921.

Application filed June 29, 1916. Serial No. 106,625.

*To all whom it may concern:*

Be it known that I, PERLEY R. GLASS, a citizen of the United States, residing at Brookline, in the county of Middlesex and State of Massachusetts, have invented certain Improvements in Turning and Beading Machines, of which the following description, in connection with the accompanying drawings, is a specification, like reference characters on the drawings indicating like parts in the several figures.

This invention relates to machines for operating upon parts of boots and shoes. In the manufacture of boots and shoes the parts of the upper are sometimes sewed together wrong side out. These parts are then turned right side out and the seams pounded or pressed. Machines which are used in thus turning the upper and pounding or pressing the seams are known as turning and beading machines and the present invention is illustrated in connection with a machine of this type. Such machines commonly comprise a coöperating hammer and anvil and a pair of turning irons, the hammer and anvil being located above and a little to one side of the turning irons. The hammer and one or both of the turning irons are operated continuously; and in the operation of the machine the work is turned right side out, the turning irons being used to get into corners, scallops, etc., and then the seam is placed upon the anvil and moved along by hand beneath the hammer.

When substantially straight seams are to be operated upon it is frequently possible to dispense with the use of turning irons, and it is desirable that automatic means be provided to feed the work across the anvil.

One feature of the present invention comprises mechanism for beading a piece of work and means for automatically feeding the work when desired while maintaining the operation of the beading mechanism. In the illustrative machine the beading mechanism may be given an additional movement in a direction at right angles to the plane of vibration of the hammer thereby producing a four-motion feed.

Another feature of the invention comprises a member for supporting substantially straight seams, said member being movable into and out of operative relation to the beading mechanism. With this construction this work supporting member may be moved into operative position when the automatic feed is thrown in so that thereafter the operator need only place the turned seam on the support and present its forward end to the beading mechanism, whereupon the seam is fed along and properly beaded.

When the automatic feed is in operation it is desirable that the turning mechanism be out of the way. Another feature of the invention comprises beading mechanism, turning mechanism, means for moving the turning mechanism to inoperative position, and means for automatically feeding the work. In the illustrative machine the turning mechanism is supported in a swinging carrier, and means are provided for throwing in the automatic feed and for moving the work support into operative position when the carrier is swung to inoperative position.

These and other features of the invention including certain details of construction and combinations of parts will be described as embodied in an illustrative machine and pointed out in the appended claims.

Figure 1 is a side elevation, partly in section, of a machine in which the present invention is embodied;

Fig. 2 is a front elevation of the machine;

Fig. 3 is a detail perspective showing a substantially straight piece of work being fed through the machine and operated upon by the pounding mechanism, and Fig. 4 is a detail perspective showing more particularly the mounting of the turning irons and the work support.

Mounted in bearings in the frame 1 of the machine is a driving shaft 3 to which power may be applied in any convenient manner, as for example, through a loose pulley 5 which may be caused to engage frictionally a tight pulley 7 by rocking a lever 9.

Fast to this shaft is a bevel gear 11 and a cam 13. A pair of turning irons 15, 17 are driven from the bevel gear 11 by a bevel gear 19 fast to the inner end of a shaft 21 which carries at its outer end an eccentric 23 by which the movable iron 15 is actuated. These turning irons may be of any suitable construction and will not be further described since the details of their construction form no part of the present invention. It will be understood, however, that they are used to aid in turning the parts of the upper right side out and are particularly useful in the scallops of button flies, corners and similar localities which would be difficult or impossible to turn completely by hand. These turning irons and their driving mechanism have hitherto been supported by a fixed portion of the frame, but in the present machine they are movably supported so as to be capable of being swung out of the way when desired for a purpose which will presently be explained. To this end the shaft 21 is mounted in bearings in a carrier 25 which is angularly movable about a vertical stud 27, the lower outer end of the carrier resting upon a beveled track 29 formed on a plate on the frame of the machine, the track serving to support the carrier during the swinging movement. The carrier, and with it the turning irons, is held in the position shown in the drawings, which is the usual position of turning irons in machines of this type, by means of a latch 31 having a locking pin 33 which enters a socket in a lug formed on the carrier.

When straight or approximately straight seams are being turned and beaded, the turning irons are not necessary. In order to facilitate operating upon such seams a work support 35, which is used alternately with the turning irons, is pivoted at 37 to the frame of the machine and is connected by a link 39 with the carrier 25. Consequently, when the latch 31 is lifted, and the support 35 swung to the left as viewed in the drawings, the gear 19 is swung out of mesh with the gear 11, the turning irons are moved out of the way, and the support is brought into the position shown in Fig. 3 in close proximity to the beading or pounding mechanism. At the same time mechanism becomes operative automatically to feed as well as to pound the work.

The mechanism by which this latter result is accomplished will now be described. The anvil 41 is yieldably and adjustably held in a socket in a head 43 which is slidably mounted on rods 45 supported by the frame of the machine; and pivoted to the head at 47 is a hammer 49. The hammer is vibrated continuously by a link 51 which is connected at its upper end with the hammer by a universal joint indicated as a whole at 53. At its lower end the link 51 is pivoted at 55 to the end of one arm of a yoke 58 which embraces the cam 13, so that, while the driving shaft 3 is rotating, the hammer 49 is being actuated to pound any work which may be placed upon the anvil 41.

When sharply curved seams are being turned and beaded the turning irons occupy the position shown in the drawings, the anvil is stationary except as it yields to the blows of the hammer, and the hammer is vibrated but not otherwise moved. When the turning irons are swung out of the way and the work support 35 is swung into operative relation to the hammer and anvil, the head 43 is rendered operative to feed the work by the following mechanism: A cam 57 on the upper end of an inclined shaft 59 engages wings on the head 43, one of which is indicated at 143 and thereby causes the head to slide back and forth on the rods 45. The shaft 59 has slidably mounted upon but keyed to its lower end a bevel gear 61 the hub of which has a groove 63 to receive a yoke on the inner end of the latch 31, said latch, as well as the yoke 58 which vibrates the hammer, being pivoted to the frame of the machine at 65. The gear 61 is urged upwardly at all times by a coiled spring 67 which tends thus to hold the bevel gears 61 and 11 in mesh. When, however, the latch 31 is in the position shown in the drawings, the gear 61 is held down against the force of the spring 67 and out of mesh with the gear 11. If now the outer end of the latch is lifted and the turning irons swung out of the way along the beveled track 29, as soon as the outer end of the latch is released it is free to descend until it contacts with the edge of the beveled track, thus permitting the spring 67 to force the gear 61 up into mesh with the gear 11 and thereby start the feed movement of the head 43 which carries the hammer and the anvil. The mechanisms for vibrating the hammer 49 and for reciprocating the head 43 may be so timed that together they cause the hammer and anvil to execute a four-motion feed. This may conveniently be accomplished by moving the gear 61 out of mesh with the gear 11 when the anvil and hammer are at a noted position, for instance at their extreme right-hand position as seen in Fig. 2; then when it is desired to move the work support 35 to operative position, first turning the machine over by hand in the direction of drive until the hammer just reaches its lowered position. If, now, the machine is started, it will be found that the gears 61 and 11 occupy the correct relative position to insure the proper feeding of the work. It should be noted here that when the turning irons are swung out of the way, gear 61 may be moved out of mesh with gear 11 by pressing upwardly on the exposed end of lever 31, so that if at any time the feeding movement should be improperly timed the relative position of the gears 61 and 11 may be corrected by moving gear 61 out of mesh with gear 11 and then turning the pulley 7 the necessary part of a revolution by hand after which the gears may be again brought into mesh by releasing lever 31.

In the illustrative machine the beading mechanism is made to serve as a part of the automatic feeding mechanism, but it is not essential in the broader aspects of the invention that these mechanisms should be combined.

Although the invention has been set forth in connection with a particular machine, it should be understood that the invention is not limited in the scope of its application to the particular machine shown and described.

Having thus described my invention, I claim as new and desire to secure by Letters Patent of the United States:

1. A machine of the class described, having in combination, mechanism for pounding a piece of work, and means for causing said mechanism either to pound the work or both to pound and to feed the work as may be desired.

2. A machine of the class described, having, in combination, mechanism for beading a piece of work and for feeding it through the machine, and operating means therefor, said mechanism being constructed and arranged to be rendered inoperative for feeding the work while remaining operative for beading it.

3. A machine of the class described, having in combination, a hammer, an anvil, and selective means for imparting vibration only to the hammer toward and from the anvil or for imparting to it both such vibration and movement in a direction to feed the work.

4. A machine of the class described, having in combination, a bodily movable head, an anvil and a hammer carried thereby, means for vibrating the hammer while maintaining the head stationary, and means for imparting movement to the head to feed the work when desired.

5. A machine of the class described, having in combination, a head slidably movable in the direction of feed movement, an anvil and a hammer carried thereby, means for vibrating the hammer while maintaining the head stationary, and means for reciprocating the head in the direction of feed when desired.

6. A machine of the class described having, in combination, mechanism for turning the work, and mechanism for pounding and feeding the work, said turning mechanism being movable to inoperative position.

7. A machine of the class described, having in combination, a mechanism for turning the work, said turning mechanism being movable to inoperative position, and means thrown into operation by movement of said turning mechanism for automatically feeding the work.

8. A machine of the class described, having in combination, pounding mechanism, turning mechanism, a work support and means for simultaneously moving said work support into operative relation to said pounding mechanism, rendering said turning mechanism inoperative, and rendering said pounding mechanism operative to feed the work along said support.

9. A machine of the class described, having in combination, a head movable in the direction of feed, a hammer and an anvil carried thereby, turning mechanism, a driving shaft, means normally connecting said turning mechanism and said hammer with said shaft, and means for disconnecting said turning mechanism and for connecting said head with said shaft.

10. A machine of the class described, having in combination, a head movable in the direction of feed, a hammer and an anvil carried thereby, turning mechanism, a driving shaft, means connecting said hammer with said shaft so as to vibrate said hammer continuously, means normally connecting said turning mechanism with said shaft, normally inoperative means for connecting said head with said shaft, a latch for maintaining the connection between said turning mechanism and said shaft, and means controlled by movement of said latch for rendering operative the connection between said head and said shaft.

11. A machine of the class described, having power operated mechanism for turning a seam and mechanism for pounding said seam, in combination with means whereby the turning mechanism may be moved to inoperative position.

12. A machine of the class described, having mechanism for turning a seam and mechanism for pounding said seam, in combination with means whereby the turning mechanism may be moved to inoperative position, and means for imparting to the pounding mechanism a feed movement.

13. A machine of the class described, having mechanism for turning a seam, in combination with means whereby the turning mechanism may be moved to inoperative position, and means for automatically feeding said seam.

14. A machine of the class described, having in combination, mechanism for turning a seam, mechanism for pounding said seam, and a driving shaft for operating both mechanisms, said turning mechanism being movable at will to disconnect it from said shaft.

15. A machine of the class described, having, in combination, power operated turning mechanism, beading mechanism, and means whereby the turning mechanism may be moved to inoperative position.

16. A machine of the class described, having, in combination, beading mechanism including an operating tool and a coöperating member between which the work is fed, a work support, and means whereby the work support may be moved into and out of operative relation to the beading mechanism.

17. A machine of the class described, having, in combination, turning mechanism movable into and out of operative position, feeding means, and means responsive to movement of the turning mechanism for controlling the operation of the feeding means.

18. A machine of the class described, having, in combination, beading mechanism, turning mechanism movable into and out of operative position, a work support also movable into and out of operative position, and means whereby movement of the turning mechanism to operative position, moves the work support to inoperative position.

19. A machine of the class described, having, in combination, turning means, mechanism for operating said turning means, beading mechanism, and means whereby one of said mechanisms may be moved to inoperative position.

20. A machine of the class described, having, in combination, turning mechanism, beading and feeding means, work supporting mechanism, and means whereby movement of one of said mechanisms controls the operation of feeding.

21. A machine of the class described, having, in combination, beading and feeding means and a work support relatively movable into and out of operative relation to each other, and means whereby said relative movement controls the operation of said means.

22. A machine of the class described, having in combination, turning means, mechanism for operating said turning means, beading mechanism, and means whereby the location of the turning mechanism may be changed.

23. A machine of the class described, having in combination, turning mechanism, beading mechanism, means for operating the beading mechanism, means for operating the turning mechanism, and means whereby one of said mechanisms may be moved to inoperative position and thereby disconnected from its operating means.

24. A machine of the class described, having in combination, turning mechanism, beading mechanism, means for operating the beading mechanism, means for operating the turning mechanism, and means whereby the turning mechanism may be moved to inoperative position and thereby disconnected from its operating means.

In testimony whereof I have signed my name to this specification.

PERLEY R. GLASS.